(12) United States Patent
Lu

(10) Patent No.: US 12,047,983 B2
(45) Date of Patent: Jul. 23, 2024

(54) RESOURCE CONFIGURATION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 490 days.

(21) Appl. No.: 17/241,497

(22) Filed: Apr. 27, 2021

(65) Prior Publication Data
US 2021/0250950 A1 Aug. 12, 2021

Related U.S. Application Data

(63) Continuation of application No. PCT/CN2018/112757, filed on Oct. 30, 2018.

(51) Int. Cl.
*H04W 72/53* (2023.01)
*H04L 1/1812* (2023.01)
(Continued)

(52) U.S. Cl.
CPC ........... *H04W 72/53* (2023.01); *H04L 1/1819* (2013.01); *H04W 72/0446* (2013.01); *H04W 72/23* (2023.01)

(58) Field of Classification Search
CPC . H04W 72/53; H04W 72/0446; H04W 72/23; H04W 72/21; H04L 1/1819;
(Continued)

(56) References Cited

U.S. PATENT DOCUMENTS

2007/0161364 A1 7/2007 Surineni et al.
2014/0204821 A1 7/2014 Seok et al.
(Continued)

FOREIGN PATENT DOCUMENTS

CN 103327625 9/2013
CN 107734678 2/2018
(Continued)

OTHER PUBLICATIONS

JPO, Office Action for JP Application No. 2021-523641, Dec. 13, 2022.
(Continued)

*Primary Examiner* — Charles C Jiang
*Assistant Examiner* — Shawn D Miller
(74) *Attorney, Agent, or Firm* — Hodgson Russ LLP

(57) ABSTRACT

Disclosed are a resource configuration method, a terminal device, a network device, a chip, a computer-readable storage medium, a computer program product and a computer program. In the method, the network device sends resource configuration information to a terminal device. The resource configuration information is used to configure a resource for a first type of service transmission for the terminal device. The resource configuration information includes: resource duration and/or service duration.

18 Claims, 8 Drawing Sheets

(51) Int. Cl.
*H04W 72/0446* (2023.01)
*H04W 72/23* (2023.01)

(58) Field of Classification Search
CPC ....... H04L 1/08; H04L 1/1822; H04L 1/1864; H04L 1/1887; H04L 1/1896; H04L 1/1893
See application file for complete search history.

(56) References Cited

U.S. PATENT DOCUMENTS

| | | | |
|---|---|---|---|
| 2016/0044665 | A1 | 2/2016 | Novlan et al. |
| 2016/0338110 | A1 | 11/2016 | Wang et al. |
| 2018/0176945 | A1* | 6/2018 | Cao ........................ H04L 5/0044 |
| 2018/0220373 | A1* | 8/2018 | Arzelier ............ H04W 52/0277 |

FOREIGN PATENT DOCUMENTS

| | | |
|---|---|---|
| CN | 108282890 A | 7/2018 |
| CN | 108631971 | 10/2018 |
| CN | 108633041 A | 10/2018 |
| CN | 108668367 A | 10/2018 |
| EP | 3214793 A2 | 9/2017 |
| EP | 3275255 A1 | 1/2018 |
| WO | 2013134952 | 9/2013 |
| WO | 2018084646 A1 | 5/2018 |
| WO | 2018166254 A1 | 9/2018 |

OTHER PUBLICATIONS

Huawei et al., Enhanced UL Configured Grant Transmissions, 3GPP TSG RAN WG1#94B R1-1810159, 3GPP, Sep. 29, 2018.
Sony, Discussion on Enhanced UL Grant-free Transmissions, 3GPP TSG RAN WG1#94B R1-1810641, 3GPP, Sep. 28, 2018.
ZTE, "On UL inter UE Tx prioritization/multiplexing," 3GPP TSG RAN WG1 Meeting #94bis, R1-1810346, Oct. 2018.
Vivo, "UL inter-UE Tx prioritization for URLLC," 3GPP TSG RAN WG1 Meeting #94bis, R1-1810396, Oct. 2018.
Oppo, "Motivation for new WI: Enhancements on scheduling and control for NR," 3GPP TSG RAN Meeting #78, RP-172511, Dec. 2017.
Samsung, "On Need for PDCCH Repetitions," 3GPP TSG RAN WG1 Meeting #92, R1-1802002, Feb. 2018.
EPO, Communication for EP Application No. 18938236.9, Nov. 4, 2022.
JPO, Office Action for JP Application No. 2021-523641, Aug. 19, 2022.
CNIPA, First Office Action for CN Application No. 202210422230. 1, Jun. 12, 2023.
JPO, Office Action for JP Application No. 2021-523641, May 9, 2023.
EPO, Communication for EP Application No. 18938236.9, May 17, 2023.
EPO, European Search Report issued for EP Application No. 18938236.9, Nov. 5, 2021.
3GPP Organizational Partners, 3GPP TR 22.804, V2.0.0, 3rd Generation Partnership Project, Technical Specification Group Services and Aspects, Study on Communication for Automation in Vertical Domains, May 2018.
"3rd Generation Partnership Project; Technical Specification Group Radio Access Network; NR; Medium Access Control (MAC) protocol specification (Release 16)," 3GPP TS 38.321, Jun. 2021, v16.5.0, 156 pages.
"3rd Generation Partnership Project; Technical Specification Group Radio Access Network; NR; Physical layer procedures for data (Release 16)," 3GPP TS 38.214, Mar. 2021, v16.5.0, 170 pages.
"3rd Generation Partnership Project; Technical Specification Group Radio Access Network; NR; Radio Resource Control (RRC) protocol specification (Release 16)," 3GPP TS 38.331, Jun. 2021, v16.5.0, 956 pages.
IPI, Office Action for IN Application No. 202117019776, Feb. 22, 2022.
EPO, Extended European Search Report for EP Application No. 18938236.9, Feb. 7, 2022.
WIPO, International Search Report and Written Opinion for PCT/CN2018/112757, Jul. 29, 2019.
EPO, Partial European Search Report for EP Application No. 23193054.6, Nov. 10, 2023.
CNIPA, Notification to Grant Patent Right for Invention for CN Application No. 202210422230.1, Sep. 21, 2023.
EPO, Extended European Search Report for EP Application No. 23193054.6, Feb. 20, 2024.
IPI, Hearing Notice for IN Application No. 202117019776, Feb. 15, 2024.

* cited by examiner

Send resource configuration information to a terminal device, the resource configuration information being used to configure a resource for a first type of service transmission for the terminal device ⎯ 201

Send resource report information to a network device, the resource report information being used to assist the network device in configuring a resource for a first type of service transmission — 801

FIG.8 first communication unit 91

FIG.9 second communication unit 1001

FIG.10

RESOURCE CONFIGURATION METHOD, NETWORK DEVICE AND TERMINAL DEVICE

CROSS-REFERENCE TO RELATED APPLICATION(S)

This application is a continuation of International Application No. PCT/CN2018/112757, filed Oct. 30, 2018, the entire disclosure of which is incorporated herein by reference.

TECHNICAL FIELD

Embodiments of the present disclosure relate to information processing technologies, and more particularly, to a resource configuration method, a terminal device, a network device, a chip, a computer-readable storage medium, a computer program product and a computer program.

BACKGROUND

In New Radio (NR), there are three major application scenarios depending on service needs: enhanced Mobile Broadband (eMBB), massive Machine Communication (mMTC), and ultra-Reliable Low-Latency Communication (uRLLC). In the uRLLC topic, uRLLC deals with high-reliability and low-latency services. Such services are usually deterministic services, that is, services will arrive within a time window. In the NR uRLLC topic, the stricter requirements for this kind of services are: the latency requirement is 0.5 ms, and the reliability requirement is 10^-6.

In the existing New Radio (NR), configured resources can be used to transmit services such as VoIP. This type of service is specifically a service with a fixed packet size and a packet arrival time which can be roughly estimated. If the existing transmission mode in which configured resources are used is adopted, there may be a problem of mismatch between the service arrival time and the configured resource time-frequency position, or a problem of mismatch between the transmission time required by service and the configured resource time-frequency position. If dynamic scheduling is used, although the scheduled time-frequency resources can be adjusted according to the service arrival time, the latency requirement may not be met, especially for the uplink transmission.

SUMMARY

In order to solve the above technical problems, embodiments of the present disclosure provide a resource configuration method, a terminal device, a network device, a chip, a computer-readable storage medium, a computer program product and a computer program.

According to a first aspect, an embodiment of the present disclosure provides a resource configuration method, applied to a network device, the method including:
  sending resource configuration information to a terminal device, wherein the resource configuration information is used to configure a resource for a first type of service transmission for the terminal device;
  wherein the resource configuration information includes: resource duration and/or service duration.

According to a second aspect, an embodiment of the present disclosure provides a resource configuration method, applied to a terminal device, the method including:
  sending resource report information to a network device, wherein the resource report information is used to assist the network device in configuring a resource for a first type of service transmission;
  wherein the resource report information includes at least one of: resource duration or service duration.

According to a third aspect, an embodiment of the present disclosure provides a network device, including:
  a first communication configured to send resource configuration information to a terminal device, wherein the resource configuration information is used to configure a resource for a first type of service transmission for the terminal device;
  wherein the resource configuration information includes: resource duration and/or service duration.

According to a fourth aspect, an embodiment of the present disclosure provides a terminal device, including:
  a second communication unit configured to send resource report information to a network device, wherein the resource report information is used to assist the network device in configuring a resource for a first type of service transmission;
  wherein the resource report information includes at least one of: resource duration or service duration.

According to a fifth aspect, an embodiment of the present disclosure provides a network device, including a processor and a memory configured to store a computer program. The processor is used to call and run the computer program stored in the memory to cause the processor to perform the method according to the first aspect or any implementation of the first aspect.

According to a sixth aspect, there is provided a terminal device, including a processor and a memory configured to store a computer program. The processor is used to call and run the computer program stored in the memory to cause the processor to perform the method according to the second aspect or any implementation of the second aspect.

According to a seventh aspect, there is provided a chip configured to perform the method according to any one of the first to second aspects or any implementation of the first to second aspects.

Specifically, the chip includes a processor which is used to call and run the computer program stored in the memory to cause a device in which the chip is installed to perform the method according to any one of the first to second aspects or any implementation of the first to second aspects.

According to an eighth aspect, there is provided a computer-readable storage medium configured to store a computer program, wherein the computer program is configured to cause a computer to perform the method according to any one of the first to second aspects or any implementation of the first to second aspects.

According to a ninth aspect, there is provided a computer program product including computer program instructions that cause a computer to perform the method according to any one of the first to second aspects or any implementation of the first to second aspects.

According to a tenth aspect, there is provided a computer program. When the computer program is run on a computer, the computer is caused to perform the method according to any one of the first to second aspects or any implementation of the first to second aspects.

In technical solutions according to embodiments of the present disclosure, the information related to resource configuration is used to transmit resource duration and/or service duration, so as to configure the resource for the first type of service transmission. In this way, it is possible to ensure that the related information is dynamically sent to the opposite end through the information to determine the transmission resource for the first type of service, and also ensure the matching between the configured resources and the service.

BRIEF DESCRIPTION OF THE DRAWINGS

FIG. 8 is a second schematic flowchart of a resource configuration method according to an embodiment of the present disclosure.

FIG. 9 is a schematic diagram showing the composition structure of a network device according to an embodiment of the present disclosure.

FIG. 10 is a schematic diagram showing the structure of a terminal device according to an embodiment of the present disclosure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figures 1, 2:
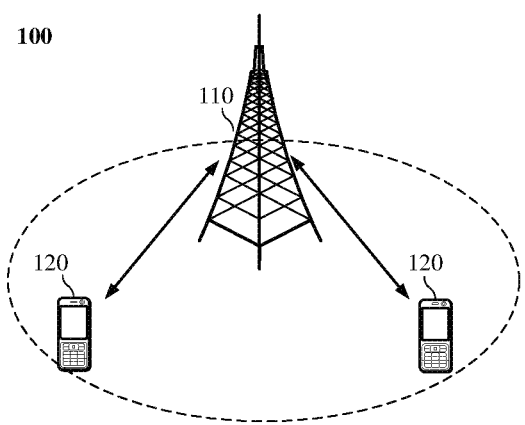
FIG. 1 is a first schematic diagram of communication system architecture according to an embodiment of the present disclosure.
FIG. 2 is a first schematic flowchart of a resource configuration method according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a network device (Base Transceiver Station, BTS) in a GSM system or a CDMA system, a network device (NodeB, NB) in a WCDMA system, an evolved network device (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network: and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals: and/or the terminal device is connected via an Internet of Things (IOT) device. A terminal device set as communicating through a wireless interface may be referred to as a "wireless communication terminal", a "wireless terminal" or a "mobile terminal". Examples of the mobile terminal include but are not limited to: satellite or cellular phone: Personal Communications System (PCS) terminal that can integrate a cellular radio phone with data processing, fax, and data communication capabilities: a PDA which can include a radio phone, a pager, an Internet/intranet access, a Web browser, a memo pad, a calendar, and/or Global Positioning System (GPS) receiver: and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" herein describes an association relationship between associated objects, which means that there can be three relationships, for example, "A and/or B" can mean: A alone, B alone, and A and B together. In addition, the character "/" herein generally indicates that the associated objects before and after "/" are in an "or" relationship.

In order to make the characteristics and technical contents of embodiments of the present disclosure more clear, embodiments of the present disclosure will be described in detail below with reference to the accompanying drawings. The drawings are provided for illustration purposes only, and are not used to limit embodiments of the present disclosure.

First Embodiment

This embodiment provides a resource configuration method which is applied to a network device. As shown in FIG. 2, the method includes the following step:

In step 201, resource configuration information is sent to a terminal device. The resource configuration information is used to configure a resource for a first type of service transmission for the terminal device. The resource configuration information includes: resource duration and/or service duration.

The first type of service may be a ultra-reliable low-latency service. In other words, for this type of service, the network side performs resource configuration for the terminal device.

Sending resource configuration information to the terminal device includes:

Sending the resource configuration information to the terminal device by at least one of the following information: Radio Resource Control (RRC), Media Access Control (MAC) Control Element (CE), or Downlink Control Information (DCI).

According to some embodiments, the resource configuration information further includes at least one of the following:

a service period, a timing offset, information of a group to which a first type of service belongs, identification of the first type of service, information size, initial arrival time of the first type of service, indication information of whether to use a repeated transmission, the number of repetitions, whether to configure at least two service transmission resources in a same service period, whether to configure at least two service transmission resources within same resource duration, configuration of at least two service transmission resources, a positional relationship between a repeated transmission and an original data packet transmission, the number of HARQ processes, or RV number.

Figure 3:
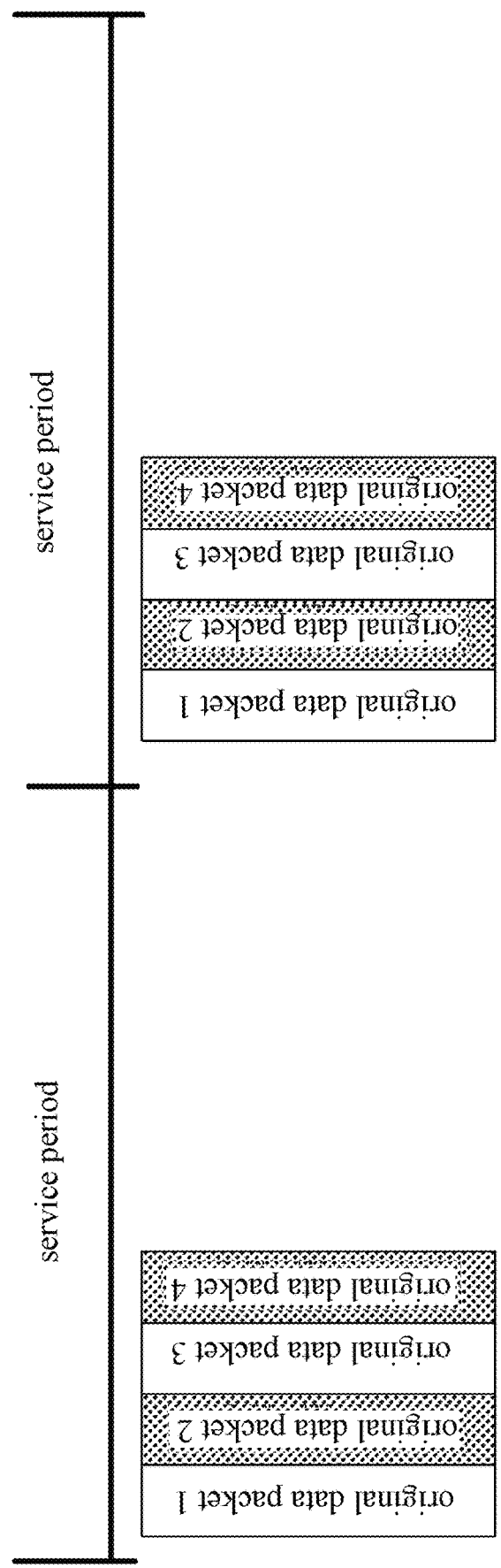
FIG. 3 is a first schematic diagram of a data packet transmission scenario according to an embodiment of the present disclosure.

Specifically, the indication information about whether to use the repeated transmission mode may be indicated by an identifier, for example, "1" may indicate repetition, and "0" may indicate no repetition. Or, the indication information about whether to use the repeated transmission mode can be indicated by whether a specific identifier appears. If the repeated transmission mode is not used, the resource transmission can be as shown in FIG. 3. When the data packets are not repeated, the original data packets 1, 2, 3, and 4 can be sent for each service period.

The positional relationship between the repeated transmission and the original data packet transmission includes at least one of the following:

each original data packet is transmitted first and then a repeated data packet is transmitted: or after all original data packets are transmitted, a repeated data packet is transmitted.

Figure 4:
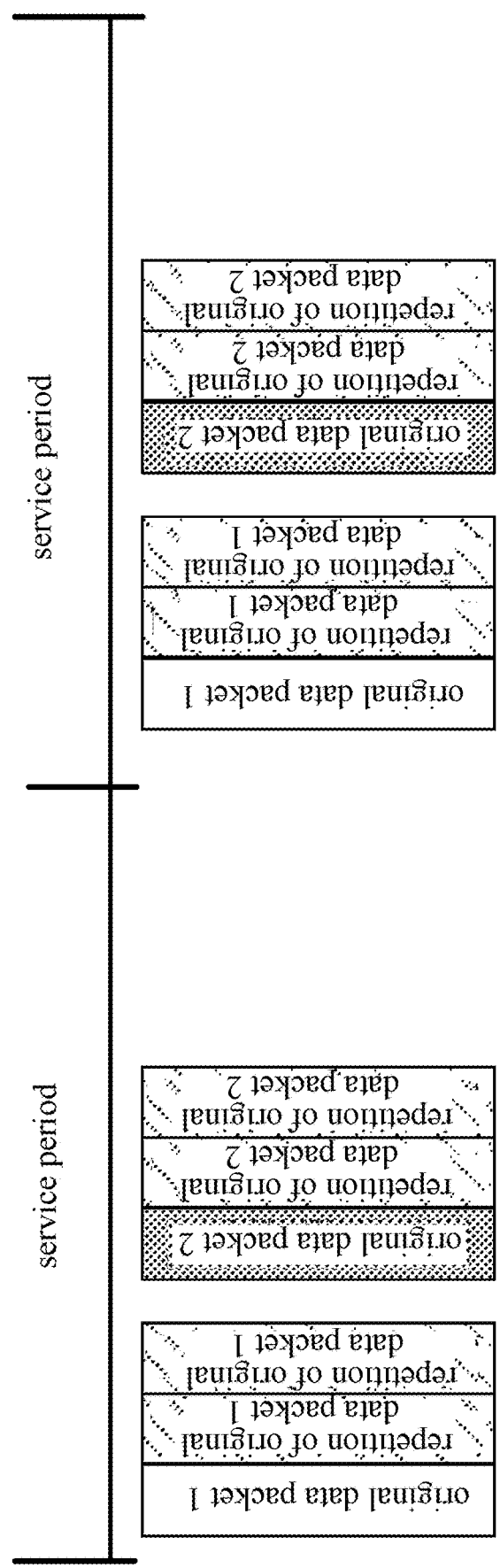
FIG. 4 is a second schematic diagram of a data packet transmission scenario according to an embodiment of the present disclosure.

Each original data packet being transmitted first and then a repeated data packet being transmitted can be understood as: a repeated data packet is transmitted immediately after each transmission of an original data packet, and after the transmission of all repeated data packets is completed, another original data packet is transmitted. The original data packet can be a Media Access Control (MAC) Protocol Data Unit (PDU). Or, the original data packet may be a data packet corresponding to the same service traffic pattern. Or, the original data packet may be a data packet corresponding to different service traffic patterns. For example, referring to FIG. 4, there can be two original data packets, i.e., original data packet 1 and original data packet 2, and each original data packet is transmitted first and then the repeated data packets are transmitted. Assuming that the number of repetitions is 2, after the data packet 1 is transmitted, two repeated data packets of the original data packet 1 are transmitted, and the original data packet 2 is transmitted in the same way.

Figure 5:
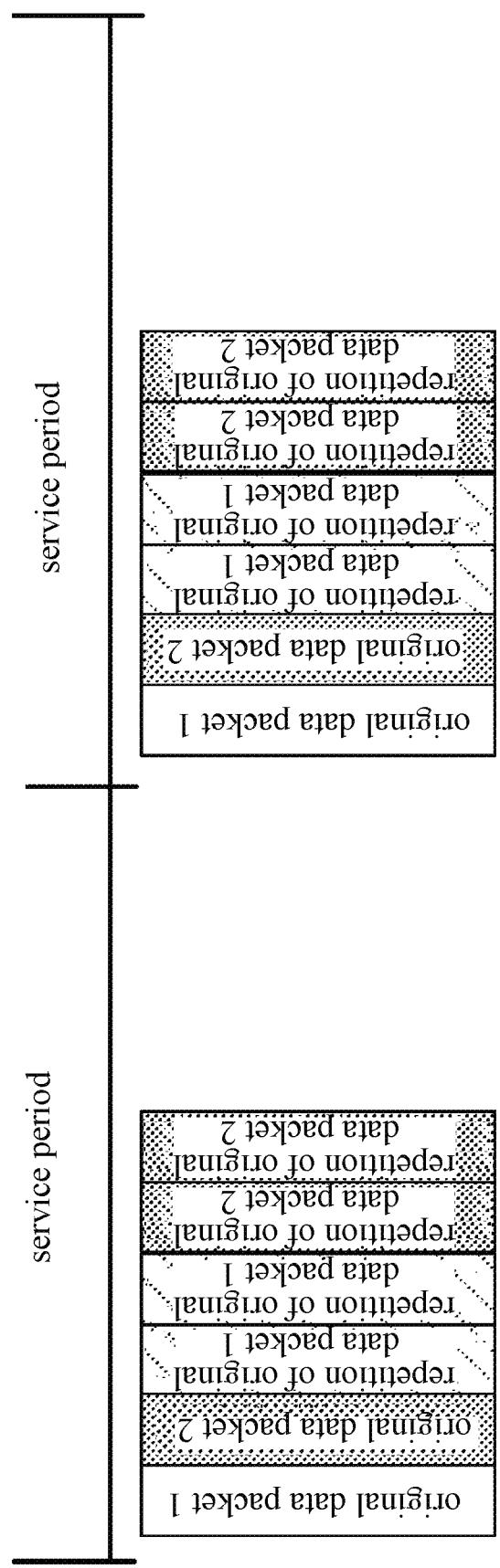
FIG. 5 is a third schematic diagram of a data packet transmission scenario according to an embodiment of the present disclosure.

Transmitting a repeated data packet after all original data packets are transmitted means that after all the original data packets are transmitted, the repeated data packets corresponding to each original data packet can be sequentially transmitted within the same service cycle. For example, referring to FIG. 5, in a service cycle, the original data packets are transmitted first, i.e., the original data packets 1 and 2 are sequentially transmitted, and then the two repeated data packets of the data packet 1 and the two repeated data packets of the original data packet 2 are sequentially transmitted.

In the at least two service transmission resources, at least one of the following information included in different service transmissions varies:

the timing offset, whether to use the repeated transmission, the number of repetitions, or the positional relationship between the repeated transmission and the original data packet transmission.

That is, when the resource configuration information can configure at least two service transmission resources in the same service cycle, for example, service transmission resource 1 and service transmission resource 2, these two service transmission resources can adopt different timing offsets, and do not adopt repeated transmission: or, the two service transmission resources can adopt different timing offsets and adopt the same number of repetitions: or, the two service transmission resources can adopt different numbers of repetitions and adopt the same timing offset: or, the service transmission resource 1 may adopt repeated transmission, and the service transmission resource 2 may not adopt repeated transmission. Other implementations are also possible, and embodiments of the present disclosure do not list all implementations.

Further, when configuring at least two service transmission resources in the same service cycle, the transmission positions and transmission modes of the transmission resources may be determined by taking the positional relationship between the repeated transmission and the original data packet transmission into account. For example, referring to FIG. 6, when three service transmission resources are configured in the same service cycle, the timing offset of the service transmission resources can be configured to be different. As shown in this figure, the first service transmission resource is configured with the first timing offset, the second timing offset for the second service transmission resource is later than the first timing offset, and the third timing offset for the third service transmission resource is later than the second timing offset. For example, when configuring three service transmission resources, the timing offsets for the service transmission resources are configured to be different, so as to ensure that there are available time-frequency resources at each point of the resource duration. Or, for example, when configuring three service transmission resources, the timing offsets of the service transmission resources are configured to be different, so as to ensure that there are available time-frequency resources at each time point of the service duration.

In addition, a corresponding transmission resource configuration can be set for each service transmission resource, and the configured content can include at least one of the following: resource duration, service duration, information of a group to which the first type of service belongs, identification of the first type of service, information size, initial arrival time of the first type of service, indication information of whether to use repeated transmission, the number of repetitions, the positional relationship between the repeated transmission and the original data packet transmission, the number of HARQ processes, or RV number.

Figure 6:
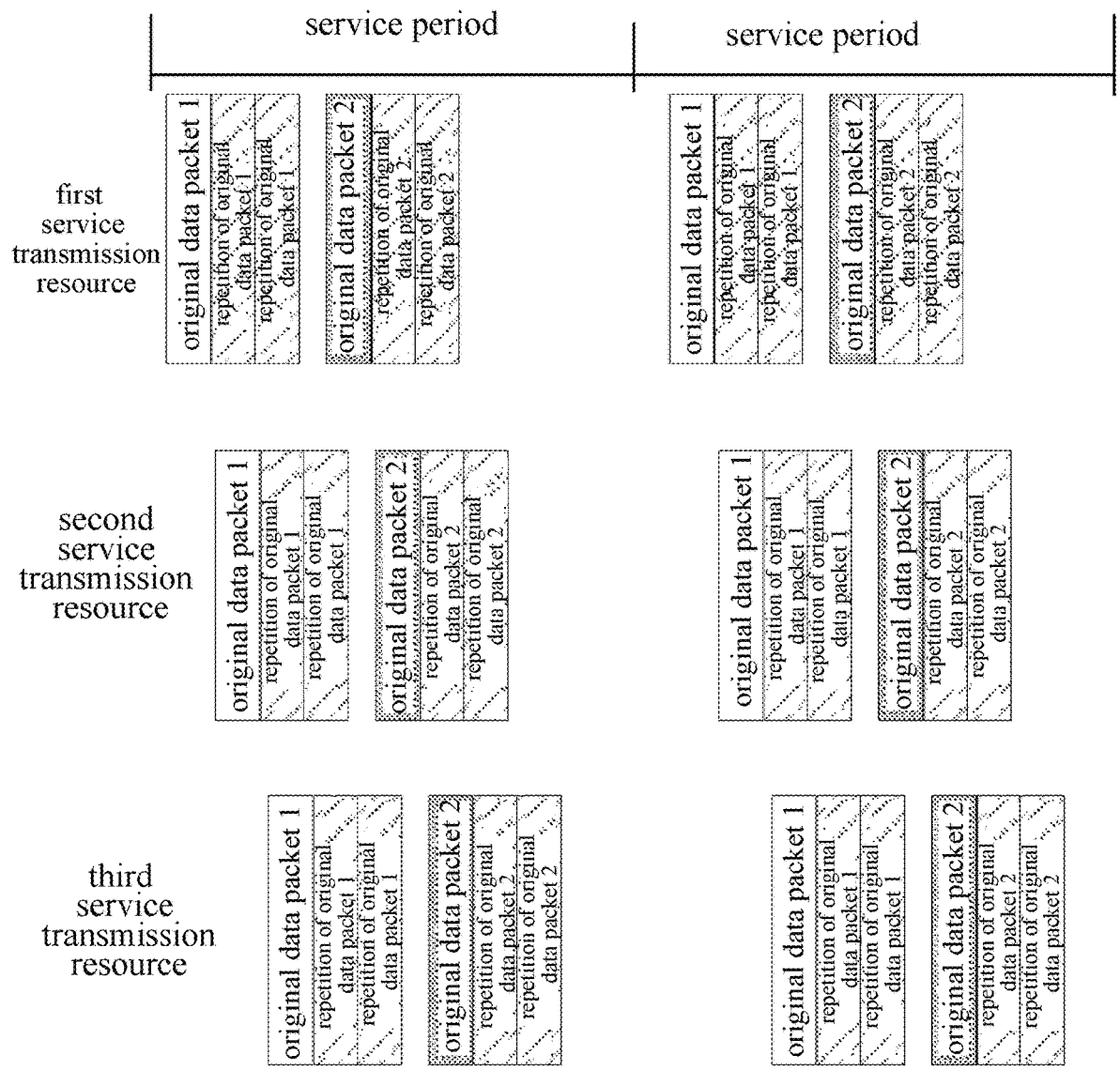
FIG. 6 is a fourth schematic diagram of a data packet transmission scenario according to an embodiment of the present disclosure.

Still referring to FIG. 6, the repeated transmission is configured and the number of repeated transmissions corresponding to each service resource is 2. In the first service transmission resource, the original data packet 1 can be transmitted and then two repeated data packets of the original data packet 1 can be directly transmitted, and then the original data packet 2 and two repeated data packets of the original data packet 2 are transmitted, and so on. For brevity, details are not provided here.

Figure 7:
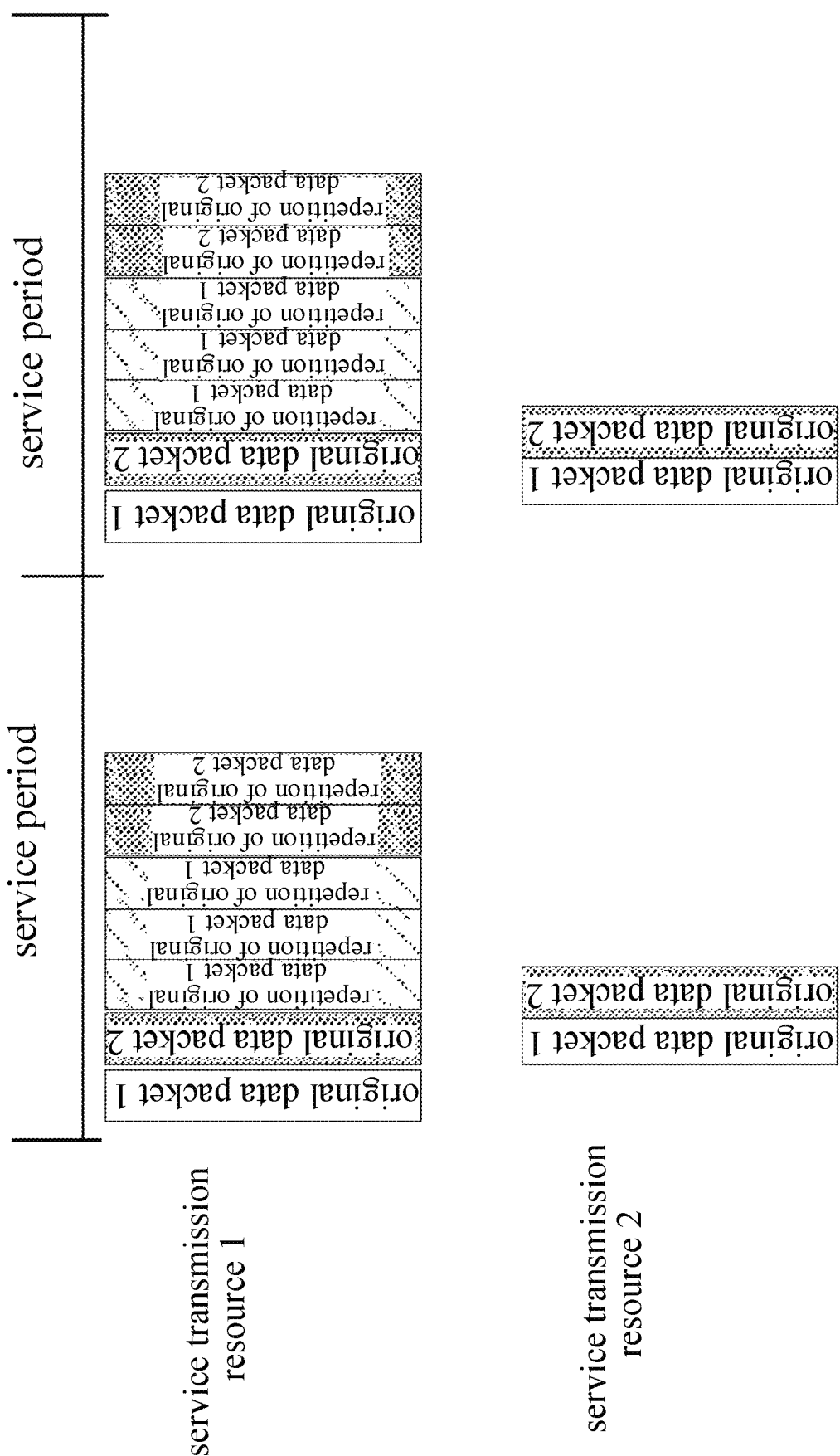
FIG. 7 is a fifth schematic diagram of a data packet transmission scenario according to an embodiment of the present disclosure.

Of course, there can also be other combinations. For example, referring to FIG. 7, two service transmission resources are configured, namely service transmission resource 1 and service transmission resource 2. In the two service transmission resources, the service transmission resource 1 is configured with the repeated transmission, and the service transmission resource 2 does not perform the repeated transmission. The number of repeated transmissions in service transmission resource 1 is three, and the positional relationship between the repeated transmission and original data packet transmission is that the repeated data packets are transmitted after all original data packets are transmitted.

In addition, when at least two service transmission resources are configured in the same service cycle (or period), it is determined to transmit data packets for the same service on each of the service transmission resources, or to transmit data packets for at least two services. Services transmitted by different service transmission resources are the same or different. That is to say, regardless of whether one service transmission resource is configured or multiple service transmission resources are configured, data packets from the same traffic can be transmitted on each service transmission resource, or data packets from multiple traffics can be transmitted, and traffics transmitted on different service transmission resources can be the same or different.

In addition, the configured resource for the first type of service transmission can be dedicated to one user or shared by multiple users.

It should be understood that the above-mentioned FIGS. 3 to 7 are only examples. In actual processing, different service transmission resources or various information in the same service transmission resource can be set differently by the resource configuration information, and embodiments of the present disclosure do not impose specific limitations on this.

It should also be pointed out that if the resource configuration information includes information about the group to which the first type of service belongs, when performing resource configuration, the configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

If the resource configuration information includes the number of HARQ processes, the number of HARQ processes included in the resource configuration information can be the number of HARQs that can be configured in a service cycle or duration. Different RV numbers can be used for repeated packets of different data packets, and the correspondence can be preset correspondence.

On the basis of the foregoing scenarios, the method according to embodiments may further includes:

receiving second information, wherein the second information is used to assist the network device in determining of configuration of the resource for the first type of service transmission.

The second information includes: information of a group to which the first type of service belongs, and/or, identification of the first type of service. The second information further includes at least one of the following: a service priority, a latency level, or a reliability level.

In other words, it is possible to determine how to configure the transmission resource for the first type of service for the terminal device by receiving the second information sent from the terminal device; or, it is possible to determine how to configure the transmission resource for the first type of service for the terminal device by receiving the second information sent from a core network device.

For example, how to configure the transmission resource for the first type of service for the terminal device can be determined based on identification of the first type of service. Different services can correspond to different duration. For example, some services correspond to three TTIs, and some services corresponds to one TTI.

The information of a group which the first type of service belongs to can be used for performing resource configuration. The configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

It is also possible to further determine and configure the transmission resource for the first type of service according to the service priority of the first type of service. For example, the number of repetitions of the services with a high priority may be higher than the number of repetitions of services with a low priority: or, resources are preferentially configured for services with a high priority: or, resources are preferentially configured for services with a high latency level: or, services whose arrival time is closer to the service transmission delay boundary are preferentially transmitted, and so on.

In the foregoing embodiments, the resource duration is a continuous time span configured for the first type of service transmission: the service duration is a time span of continuous arrival of the first type of service, or the service duration is a time span of delayed arrival of the first type of service. The resource duration is greater than or equal to the service duration: or the resource duration is smaller than the service duration.

The granularity of the time span is at least one of the following: a symbol, millisecond, TTI, a slot, a subframe, or a radio frame.

For example, if the granularity of the time span is a slot, then the resource duration can be defined as four slots and the service duration can be defined as three slots.

The service period is not smaller than the resource duration.

The time position of the service transmission resource is included in the resource duration, one service transmission resource time matches the resource duration, or all service transmission resource times match the resource duration.

The resource duration is generally set to be greater than or equal to the service duration.

When the resource duration is smaller than the service duration, it is indicated that the service exceeding the resource duration is not transmitted.

In other words, if the resource duration in the resource configuration information is smaller than the service duration, the terminal device can determine that when the duration of the service to be transmitted exceeds the resource duration, the remaining services will not be transmitted if the duration of the service transmission reaches the resource duration.

The resource configuration information further includes: resource configuration information used for uplink first type of service transmission, and/or resource configuration information used for downlink first type of service transmission: the resource configuration information used for the uplink first type of service transmission is the same as or different from the resource configuration information used for the downlink first type of service transmission. That is to say, when the sent resource configuration information is the resource configuration information used for uplink first type of service transmission, the terminal device can perform the uplink transmission of the first type of service based on the resource configuration information: and/or when the sent resource configuration information is the resource configuration information used for downlink first type of service transmission, the terminal device can perform the downlink transmission of the first type of service based on the resource configuration information, determine the received time-frequency resource positions, and receive the downlink information of the first type of service from the network side.

Finally, it should be pointed out that in embodiments of the present disclosure, the first type of service scenario includes but is not limited to at least one of the following: a periodic deterministic service, an aperiodic deterministic service, a mixed service, a non-deterministic service, a VoIP service, a control scenario of automated trains, motion control, a control-to-control application scenario, a mobile control panel, a mobile robot, audio streaming for live performance, and robotic arm operation.

In technical solutions according to embodiments of the present disclosure, the information related to resource configuration is used to transmit resource duration and/or service duration, so as to configure the resource for the first type of service transmission. In this way, it is possible to ensure that the related information is dynamically sent to the opposite end through the information to determine the transmission resource for the first type of service, and also ensure the matching between the configured resources and the service.

Second Embodiment

This embodiment provides a resource configuration method which is applied to a terminal device. As shown in FIG. 8, the method includes the following step:

In step 801, resource report information is sent to a network device. The resource report information is used to assist the network device in configuring a resource for a first type of service transmission. The resource report information includes: resource duration or service duration.

The first type of service may be a ultra-reliable low-latency service. In other words, for this type of service, the network side performs resource configuration for the terminal device.

The resource report information is sent by at least one of the following information: Radio Resource Control (RRC), Media Access Control (MAC) Control Element (CE), or Downlink Control Information (DCI).

According to some embodiments, the resource report information further includes at least one of the following:
  a service period, a timing offset, information of a group to which a first type of service belongs, identification of the first type of service, information size, initial arrival time of the first type of service, indication information of whether to use a repeated transmission, the number of repetitions, whether to configure at least two service transmission resources in a same service period, whether to configure at least two service transmission resources within same resource duration, configuration of at least two service transmission resources, a positional relationship between a repeated transmission and an original data packet transmission, the number of HARQ processes, or RV number.

Specifically, the indication information about whether to use the repeated transmission mode may be indicated by an identifier, for example, "1" may indicate repetition, and "0" may indicate no repetition. Or, the indication information about whether to use the repeated transmission mode can be indicated by whether a specific identifier appears. If the repeated transmission mode is not used, the resource transmission can be as shown in FIG. 3. When the data packets are not repeated, the original data packets 1, 2, 3, and 4 can be sent for each service period.

The positional relationship between the repeated transmission and the original data packet transmission includes at least one of the following:
  each original data packet is transmitted first and then a repeated data packet is transmitted: or after all original data packets are transmitted, a repeated data packet is transmitted.

Each original data packet being transmitted first and then a repeated data packet being transmitted can be understood as: a repeated data packet is transmitted immediately after each transmission of an original data packet, and after the transmission of all repeated data packets is completed, another original data packet is transmitted. The original data packet can be a Media Access Control (MAC) Protocol Data Unit (PDU). Or, the original data packet may be a data packet corresponding to the same service traffic pattern. Or, the original data packet may be a data packet corresponding to different service traffic patterns. For example, referring to FIG. 4, there can be two original data packets, i.e., original data packet 1 and original data packet 2, and each original data packet is transmitted first and then the repeated data packets are transmitted. Assuming that the number of repetitions is 2, after the data packet 1 is transmitted, two repeated data packets of the original data packet 1 are transmitted, and the original data packet 2 is transmitted in the same way.

Transmitting a repeated data packet after all original data packets are transmitted means that after all the original data packets are transmitted, the repeated data packets corresponding to each original data packet can be sequentially transmitted within the same service cycle. For example, referring to FIG. 5, in a service cycle, the original data packets are transmitted first, i.e., the original data packets 1 and 2 are sequentially transmitted, and then the two repeated data packets of the data packet 1 and the two repeated data packets of the original data packet 2 are sequentially transmitted.

In the at least two service transmission resources, at least one of the following information included in different service transmissions varies:
  the timing offset, whether to use the repeated transmission, the number of repetitions, or the positional relationship between the repeated transmission and the original data packet transmission.

That is, when the resource configuration information can configure at least two service transmission resources in the same service cycle, for example, service transmission resource 1 and service transmission resource 2, these two service transmission resources can adopt different timing offsets, and do not adopt repeated transmission: or, the two service transmission resources can adopt different timing offsets and adopt the same number of repetitions: or, the two service transmission resources can adopt different numbers of repetitions and adopt the same timing offset: or, the service transmission resource 1 may adopt repeated transmission, and the service transmission resource 2 may not adopt repeated transmission. Other implementations are also possible, and embodiments of the present disclosure do not list all implementations.

Further, when configuring at least two service transmission resources in the same service cycle, the transmission positions and transmission modes of the transmission resources may be determined by taking the positional relationship between the repeated transmission and the original data packet transmission into account. For example, referring to FIG. 6, when three service transmission resources are configured in the same service cycle, the timing offset of the service transmission resources can be configured to be different. As shown in this figure, the first service transmission resource is configured with the first timing offset, the second timing offset for the second service transmission resource is later than the first timing offset, and the third timing offset for the third service transmission resource is later than the second timing offset. For example, when configuring three service transmission resources, the timing offsets for the service transmission resources are configured to be different, so as to ensure that there are available time-frequency resources at each point of the resource duration. Or, for example, when configuring three service transmission resources, the timing offsets of the service transmission resources are configured to be different, so as to ensure that there are available time-frequency resources at each time point of the service duration.

In addition, a corresponding transmission resource configuration can be set for each service transmission resource, and the configured content can include at least one of the following: resource duration, service duration, information of a group to which the first type of service belongs, identification of the first type of service, information size, initial arrival time of the first type of service, indication information of whether to use repeated transmission, the number of repetitions, the positional relationship between the repeated transmission and the original data packet transmission, the number of HARQ processes, or RV (redundancy version) number.

Still referring to FIG. 6, the repeated transmission is configured and the number of repeated transmissions corresponding to each service resource is 2. In the first service transmission resource, the original data packet 1 can be transmitted and then two repeated data packets of the original data packet 1 can be directly transmitted, and then the original data packet 2 and two repeated data packets of the original data packet 2 are transmitted, and so on. For brevity, details are not provided here.

Of course, there can also be other combinations. For example, referring to FIG. 7, two service transmission resources are configured, namely service transmission resource 1 and service transmission resource 2. In the two service transmission resources, the service transmission resource 1 is configured with the repeated transmission, and the service transmission resource 2 does not perform the repeated transmission. The number of repeated transmissions in service transmission resource 1 is three, and the positional relationship between the repeated transmission and original data packet transmission is that the repeated data packets are transmitted after all original data packets are transmitted.

In addition, when at least two service transmission resources are configured in the same service cycle (or period), it is determined to transmit data packets for the same service on each of the service transmission resources, or to transmit data packets for at least two services. Services transmitted by different service transmission resources are the same or different. That is to say, regardless of whether one service transmission resource is configured or multiple service transmission resources are configured, data packets from the same traffic can be transmitted on each service transmission resource, or data packets from multiple traffics can be transmitted, and traffics transmitted on different service transmission resources can be the same or different.

In addition, the configured resource for the first type of service transmission can be dedicated to one user or shared by multiple users.

It should be understood that the above-mentioned FIGS. 3 to 7 are only examples. In actual processing, different service transmission resources or various information in the same service transmission resource can be set differently by the resource configuration information, and embodiments of the present disclosure do not impose specific limitations on this.

It should also be pointed out that if the resource configuration information includes information about the group to which the first type of service belongs, when performing resource configuration, the configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources: resource configuration can be preferentially performed for services with low latency tolerance. The latency tolerance being low can be understood as high-reliability and low-latency services. In addition, resource configuration based on reliability level is similar to the aforementioned resource configuration based on priority, and will not be repeated.

If the resource configuration information includes the number of HARQ processes, the number of HARQ processes included in the resource configuration information can be the number of HARQs that can be configured in a service cycle or duration. Different RV numbers can be used for repeated packets of different data packets, and their correspondence can be preset correspondence.

On the basis of the foregoing scenarios, the method according to embodiments may further includes:

sending second information to the network device, wherein the second information is used to assist the network device in determining of configuration of the resource for the first type of service transmission.

The second information includes: information of a group to which the first type of service belongs, and/or, identification of the first type of service. The second information further includes at least one of the following: a service priority, a latency level, or a reliability level.

In other words, the network device side can determine how to configure the transmission resource for the first type of service for the terminal device by the second information: or, it is possible to determine how to configure the transmission resource for the first type of service for the terminal device by receiving the second information sent from a core network device.

For example, how to configure the transmission resource for the first type of service can be determined based on identification of the first type of service. Different services can correspond to different duration. For example, some services correspond to three TTIs, and some services correspond to one TTI.

The information of a group which the first type of service belongs to can be used for performing resource configuration. The configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

It is also possible to further determine and configure the transmission resource for the first type of service according to the service priority of the first type of service. For example, the number of repetitions of the services with a high priority may be higher than the number of repetitions of services with a low priority: or, resources are preferentially configured for services with a high priority: or, resources are preferentially configured for services with a high latency level: or, services whose arrival time is closer to the service transmission delay boundary are preferentially transmitted, and so on.

In the foregoing embodiments, the resource duration is a continuous time span configured for the first type of service transmission: the service duration is a time span of continuous arrival of the first type of service, or the service duration is a time span of delayed arrival of the first type of service. The resource duration is greater than or equal to the service duration: or the resource duration is smaller than the service duration.

The granularity of the time span is at least one of the following: a symbol, millisecond, TTI, a slot, a subframe, or a radio frame.

For example, if the granularity of the time span is a slot, then the resource duration can be defined as four slots and the service duration can be defined as three slots.

The service period is not smaller than the resource duration.

The time position of the service transmission resource is included in the resource duration, one service transmission resource time matches the resource duration, or all service transmission resource times match the resource duration.

The resource duration is generally set to be greater than or equal to the service duration.

When the resource duration is smaller than the service duration, the service exceeding the resource duration is not transmitted.

In other words, if the resource duration is smaller than the service duration, the terminal device can determine that when the duration of the service to be transmitted exceeds the resource duration, the remaining services will not be transmitted if the duration of the service transmission reaches the resource duration.

The resource configuration information further includes: resource configuration information used for uplink first type of service transmission, and/or resource configuration information used for downlink first type of service transmission: the resource configuration information used for the uplink first type of service transmission is the same as or different from the resource configuration information used for the downlink first type of service transmission. That is to say, when the sent resource configuration information is the resource configuration information used for uplink first type of service transmission, the terminal device can perform the uplink transmission of the first type of service based on the resource configuration information: and/or when the sent resource configuration information is the resource configuration information used for downlink first type of service transmission, the terminal device can perform the downlink transmission of the first type of service based on the resource configuration information, determine the received time-frequency resource positions, and receive the downlink information of the first type of service from the network side.

The sending the resource report information to the network device includes:
  when a first condition is met, sending the resource report information to the network device.

The first condition includes one of at least one of the following conditions.

A bearer for the terminal device corresponding to the first type of service is established.

The terminal device receives a trigger indication from the network device. For example, the terminal receives trigger indication information sent from the network side, and if it is determined that the trigger indication information is received, the terminal device starts to send the resource report information to the network side.

The terminal device receives an indication that the network device has a capability of receiving the resource report information. For example, the network side may send indication information to the terminal device after the terminal device accesses the network, and the indication information may be used to inform the terminal device whether the network side has the capability to receive resource report information by a corresponding indication field. For example, when the indication information is 1, it indicates that the network side has the capability, and when the indication information is 0, or when the indication information does not appear, it means that the network side does not have the capability. Of course, the reverse is true in actual processing, and the setting is performed according to actual situations, and the details are not repeated.

A bearer for the terminal device is changed. That is, when the bearer for the terminal device is changed, the terminal device starts to send the resource report information.

A service feature of the first type of service for the terminal device is changed. The service feature can be determined by parameters such as QoS, and once such parameters are changed, the terminal device can be triggered to send the resource report information to the network device.

The terminal device meets a reporting period. The reporting period can be set according to actual situations, for example, resource report information can be reported once every 24 hours. According to some other embodiments, the reporting period can be set to a period of seconds, milliseconds, or minutes. Specific setting can be determined based on actual situations, and embodiments of the present disclosure do not list all the situations.

Finally, it should be pointed out that in embodiments of the present disclosure, the first type of service scenario includes but is not limited to at least one of the following: a periodic deterministic service, an aperiodic deterministic service, a mixed service, a non-deterministic service, a VoIP service, a control scenario of automated trains, motion control, a control-to-control application scenario, a mobile control panel, a mobile robot, audio streaming for live performance, and robotic arm operation.

In technical solutions according to embodiments of the present disclosure, the information related to resource configuration is used to transmit resource duration and/or service duration, so as to configure the resource for the first type of service transmission. In this way, it is possible to ensure that the related information is dynamically sent to the opposite end through the information to determine the transmission resource for the first type of service, and also ensure the matching between the configured resources and the service.

Third Embodiment

This embodiment provides a network device. As shown in FIG. 9, the network device includes a first communication unit 91.

The first communication unit 91 is configured to send resource configuration information to a terminal device. The resource configuration information is used to configure a resource for a first type of service transmission for the terminal device. The resource configuration information includes: resource duration and/or service duration.

The first type of service may be a ultra-reliable low-latency service. In other words, for this type of service, the network side performs resource configuration for the terminal device.

Sending resource configuration information to the terminal device includes:

Sending the resource configuration information to the terminal device by at least one of the following information: Radio Resource Control (RRC), Media Access Control (MAC) Control Element (CE), or Downlink Control Information (DCI).

According to some embodiments, the resource configuration information further includes at least one of the following:

a service period, a timing offset, information of a group to which a first type of service belongs, identification of the first type of service, information size, initial arrival time of the first type of service, indication information of whether to use a repeated transmission, the number of repetitions, whether to configure at least two service transmission resources in a same service period, whether to configure at least two service transmission resources within same resource duration, configuration of at least two service transmission resources, a positional relationship between a repeated transmission and an original data packet transmission, the number of HARQ processes, or RV number.

Specifically, the indication information about whether to use the repeated transmission mode may be indicated by an identifier, for example, "1" may indicate repetition, and "0" may indicate no repetition. Or, the indication information about whether to use the repeated transmission mode can be indicated by whether a specific identifier appears. If the repeated transmission mode is not used, the resource transmission can be as shown in FIG. 3. When the data packets are not repeated, the original data packets 1, 2, 3, and 4 can be sent for each service period.

The positional relationship between the repeated transmission and the original data packet transmission includes at least one of the following:

each original data packet is transmitted first and then a repeated data packet is transmitted: or after all original data packets are transmitted, a repeated data packet is transmitted.

Each original data packet being transmitted first and then a repeated data packet being transmitted can be understood as: a repeated data packet is transmitted immediately after each transmission of an original data packet, and after the transmission of all repeated data packets is completed, another original data packet is transmitted. The original data packet can be a Media Access Control (MAC) Protocol Data Unit (PDU). Or, the original data packet may be a data packet corresponding to the same service traffic pattern. Or, the original data packet may be a data packet corresponding to different service traffic patterns. For example, referring to FIG. 4, there can be two original data packets, i.e., original data packet 1 and original data packet 2, and each original data packet is transmitted first and then the repeated data packets are transmitted. Assuming that the number of repetitions is 2, after the data packet 1 is transmitted, two repeated data packets of the original data packet 1 are transmitted, and the original data packet 2 is transmitted in the same way.

Transmitting a repeated data packet after all original data packets are transmitted means that after all the original data packets are transmitted, the repeated data packets corresponding to each original data packet can be sequentially transmitted within the same service cycle. For example, referring to FIG. 5, in a service cycle, the original data packets are transmitted first, i.e., the original data packets 1 and 2 are sequentially transmitted, and then the two repeated data packets of the data packet 1 and the two repeated data packets of the original data packet 2 are sequentially transmitted.

In the at least two service transmission resources, at least one of the following information included in different service transmissions varies:

the timing offset, whether to use the repeated transmission, the number of repetitions, or the positional relationship between the repeated transmission and the original data packet transmission.

That is, when the resource configuration information can configure at least two service transmission resources in the same service cycle, for example, service transmission resource 1 and service transmission resource 2, these two service transmission resources can adopt different timing offsets, and do not adopt repeated transmission: or, the two service transmission resources can adopt different timing offsets and adopt the same number of repetitions: or, the two service transmission resources can adopt different numbers of repetitions and adopt the same timing offset: or, the service transmission resource 1 may adopt repeated transmission, and the service transmission resource 2 may not adopt repeated transmission. Other implementations are also possible, and embodiments of the present disclosure do not list all implementations.

Further, when configuring at least two service transmission resources in the same service cycle, the transmission positions and transmission modes of the transmission resources may be determined by taking the positional relationship between the repeated transmission and the original data packet transmission into account. For example, referring to FIG. 6, when three service transmission resources are configured in the same service cycle, the timing offset of the service transmission resources can be configured to be different. As shown in this figure, the first service transmission resource is configured with the first timing offset, the second timing offset for the second service transmission resource is later than the first timing offset, and the third timing offset for the third service transmission resource is later than the second timing offset. For example, when configuring three service transmission resources, the timing offsets for the service transmission resources are configured to be different, so as to ensure that there are available time-frequency resources at each point of the resource duration. Or, for example, when configuring three service transmission resources, the timing offsets of the service transmission resources are configured to be different, so as to ensure that there are available time-frequency resources at each time point of the service duration.

In addition, a corresponding transmission resource configuration can be set for each service transmission resource, and the configured content can include at least one of the following: resource duration, service duration, information of a group to which the first type of service belongs, identification of the first type of service, information size, initial arrival time of the first type of service, indication information of whether to use repeated transmission, the number of repetitions, the positional relationship between the repeated transmission and the original data packet transmission, the number of HARQ processes, or RV number.

Still referring to FIG. 6, the repeated transmission is configured and the number of repeated transmissions corresponding to each service resource is 2. In the first service transmission resource, the original data packet 1 can be transmitted and then two repeated data packets of the original data packet 1 can be directly transmitted, and then the original data packet 2 and two repeated data packets of the original data packet 2 are transmitted, and so on. For brevity, details are not provided here.

Of course, there can also be other combinations. For example, referring to FIG. 7, two service transmission resources are configured, namely service transmission resource 1 and service transmission resource 2. In the two service transmission resources, the service transmission resource 1 is configured with the repeated transmission, and the service transmission resource 2 does not perform the repeated transmission. The number of repeated transmissions in service transmission resource 1 is three, and the positional relationship between the repeated transmission and original data packet transmission is that the repeated data packets are transmitted after all original data packets are transmitted.

In addition, the first communication unit 91 is configured to, when at least two service transmission resources are configured in the same service cycle (or period), determine to transmit data packets for the same service on each of the service transmission resources, or to transmit data packets for at least two services. Services transmitted by different service transmission resources are the same or different. That is to say, regardless of whether one service transmission resource is configured or multiple service transmission resources are configured, data packets from the same traffic can be transmitted on each service transmission resource, or data packets from multiple traffics can be transmitted, and traffics transmitted on different service transmission resources can be the same or different.

In addition, the configured resource for the first type of service transmission can be dedicated to one user or shared by multiple users.

It should be understood that the above-mentioned FIGS. 3 to 7 are only examples. In actual processing, different service transmission resources or various information in the same service transmission resource can be set differently by the resource configuration information, and embodiments of the present disclosure do not impose specific limitations on this.

It should also be pointed out that if the resource configuration information includes information about the group to which the first type of service belongs, when performing resource configuration, the configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

If the resource configuration information includes the number of HARQ processes, the number of HARQ processes included in the resource configuration information can be the number of HARQs that can be configured in a service cycle or duration. Different RV numbers can be used for repeated packets of different data packets, and the correspondence can be preset correspondence.

On the basis of the foregoing scenarios, the first communication unit 91 is configured to: receive second information, wherein the second information is used to assist the network device in determining of configuration of the resource for the first type of service transmission.

The second information includes: information of a group to which the first type of service belongs, and/or, identification of the first type of service. The second information further includes at least one of the following: a service priority, a latency level, or a reliability level.

In other words, it is possible to determine how to configure the transmission resource for the first type of service for the terminal device by receiving the second information sent from the terminal device: or, it is possible to determine how to configure the transmission resource for the first type of service for the terminal device by receiving the second information sent from a core network device.

For example, how to configure the transmission resource for the first type of service for the terminal device can be determined based on identification of the first type of service. Different services can correspond to different duration. For example, some services correspond to three TTIs, and some services correspond to one TTI.

The information of a group which the first type of service belongs to can be used for performing resource configuration. The configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

It is also possible to further determine and configure the transmission resource for the first type of service according to the service priority of the first type of service. For example, the number of repetitions of the services with a high priority may be higher than the number of repetitions of services with a low priority: or, resources are preferentially configured for services with a high priority: or, resources are preferentially configured for services with a high latency level: or, services whose arrival time is closer to the service transmission delay boundary are preferentially transmitted, and so on.

In the foregoing embodiments, the resource duration is a continuous time span configured for the first type of service transmission: the service duration is a time span of continuous arrival of the first type of service, or the service duration is a time span of delayed arrival of the first type of service. The resource duration is greater than or equal to the service duration: or the resource duration is smaller than the service duration.

The granularity of the time span is at least one of the following: a symbol, millisecond, TTI, a slot, a subframe, or a radio frame.

For example, if the granularity of the time span is a slot, then the resource duration can be defined as four slots and the service duration can be defined as three slots.

The service period is not smaller than the resource duration.

The time position of the service transmission resource is included in the resource duration, one service transmission resource time matches the resource duration, or all service transmission resource times match the resource duration.

The resource duration is generally set to be greater than or equal to the service duration.

When the resource duration is smaller than the service duration, it is indicated that the service exceeding the resource duration is not transmitted.

In other words, if the resource duration in the resource configuration information is smaller than the service duration, the terminal device can determine that when the duration of the service to be transmitted exceeds the resource duration, the remaining services will not be transmitted if the duration of the service transmission reaches the resource duration.

The resource configuration information further includes: resource configuration information used for uplink first type of service transmission, and/or resource configuration information used for downlink first type of service transmission: the resource configuration information used for the uplink first type of service transmission is the same as or different from the resource configuration information used for the downlink first type of service transmission. That is to say, when the sent resource configuration information is the resource configuration information used for uplink first type of service transmission, the terminal device can perform the uplink transmission of the first type of service based on the resource configuration information: and/or when the sent resource configuration information is the resource configuration information used for downlink first type of service transmission, the terminal device can perform the downlink transmission of the first type of service based on the resource configuration information, determine the received time-frequency resource positions, and receive the downlink information of the first type of service from the network side.

Finally, it should be pointed out that in embodiments of the present disclosure, the first type of service scenario includes but is not limited to at least one of the following: a periodic deterministic service, an aperiodic deterministic service, a mixed service, a non-deterministic service, a VoIP service, a control scenario of automated trains, motion control, a control-to-control application scenario, a mobile control panel, a mobile robot, audio streaming for live performance, and robotic arm operation.

In technical solutions according to embodiments of the present disclosure, the information related to resource configuration is used to transmit resource duration and/or service duration, so as to configure the resource for the first type of service transmission. In this way, it is possible to ensure that the related information is dynamically sent to the opposite end through the information to determine the transmission resource for the first type of service, and also ensure the matching between the configured resources and the service.

Fourth Embodiment

This embodiment provides a terminal device. As shown in FIG. 10, the terminal device includes a second communication unit 1001.

The second communication unit 1001 is configured to send resource report information to a network device. The resource report information is used to assist the network device in configuring a resource for a first type of service transmission. The resource report information includes: resource duration or service duration.

The first type of service may be a ultra-reliable low-latency service. In other words, for this type of service, the network side performs resource configuration for the terminal device.

The resource report information is sent by at least one of the following information: Radio Resource Control (RRC), Media Access Control (MAC) Control Element (CE), or Downlink Control Information (DCI).

According to some embodiments, the resource report information further includes at least one of the following:
  a service period, a timing offset, information of a group to which a first type of service belongs, identification of the first type of service, information size, initial arrival time of the first type of service, indication information of whether to use a repeated transmission, the number of repetitions, whether to configure at least two service transmission resources in a same service period, whether to configure at least two service transmission resources within same resource duration, configuration of at least two service transmission resources, a positional relationship between a repeated transmission and an original data packet transmission, the number of HARQ processes, or RV number.

Specifically, the indication information about whether to use the repeated transmission mode may be indicated by an identifier, for example, "1" may indicate repetition, and "0" may indicate no repetition. Or, the indication information about whether to use the repeated transmission mode can be indicated by whether a specific identifier appears. If the repeated transmission mode is not used, the resource transmission can be as shown in FIG. 3. When the data packets are not repeated, the original data packets 1, 2, 3, and 4 can be sent for each service period.

The positional relationship between the repeated transmission and the original data packet transmission includes at least one of the following:
  each original data packet is transmitted first and then a repeated data packet is transmitted: or after all original data packets are transmitted, a repeated data packet is transmitted.

Each original data packet being transmitted first and then a repeated data packet being transmitted can be understood as: a repeated data packet is transmitted immediately after each transmission of an original data packet, and after the transmission of all repeated data packets is completed, another original data packet is transmitted. The original data packet can be a Media Access Control (MAC) Protocol Data Unit (PDU). Or, the original data packet may be a data packet corresponding to the same service traffic pattern. Or, the original data packet may be a data packet corresponding to different service traffic patterns. For example, referring to FIG. 4, there can be two original data packets, i.e., original data packet 1 and original data packet 2, and each original data packet is transmitted first and then the repeated data packets are transmitted. Assuming that the number of repetitions is 2, after the data packet 1 is transmitted, two repeated data packets of the original data packet 1 are transmitted, and the original data packet 2 is transmitted in the same way.

Transmitting a repeated data packet after all original data packets are transmitted means that after all the original data packets are transmitted, the repeated data packets corresponding to each original data packet can be sequentially transmitted within the same service cycle. For example, referring to FIG. 5, in a service cycle, the original data packets are transmitted first, i.e., the original data packets 1 and 2 are sequentially transmitted, and then the two repeated data packets of the data packet 1 and the two repeated data packets of the original data packet 2 are sequentially transmitted.

In the at least two service transmission resources, at least one of the following information included in different service transmissions varies:
  the timing offset, whether to use the repeated transmission, the number of repetitions, or the positional relationship between the repeated transmission and the original data packet transmission.

That is, when the resource configuration information can configure at least two service transmission resources in the same service cycle, for example, service transmission resource 1 and service transmission resource 2, these two service transmission resources can adopt different timing offsets, and do not adopt repeated transmission: or, the two service transmission resources can adopt different timing offsets and adopt the same number of repetitions: or, the two service transmission resources can adopt different numbers of repetitions and adopt the same timing offset: or, the service transmission resource 1 may adopt repeated transmission, and the service transmission resource 2 may not adopt repeated transmission. Other implementations are also possible, and embodiments of the present disclosure do not list all implementations.

Further, when configuring at least two service transmission resources in the same service cycle, the transmission positions and transmission modes of the transmission resources may be determined by taking the positional relationship between the repeated transmission and the original data packet transmission into account. For example, referring to FIG. 6, when three service transmission resources are configured in the same service cycle, the timing offset of the service transmission resources can be configured to be different. As shown in this figure, the first service transmission resource is configured with the first timing offset, the second timing offset for the second service transmission resource is later than the first timing offset, and the third timing offset for the third service transmission resource is later than the second timing offset. For example, when configuring three service transmission resources, the timing offsets for the service transmission resources are configured to be different, so as to ensure that there are available time-frequency resources at each point of the resource duration. Or, for example, when configuring three service transmission resources, the timing offsets of the service transmission resources are configured to be different, so as to ensure that there are available time-frequency resources at each time point of the service duration.

In addition, a corresponding transmission resource configuration can be set for each service transmission resource, and the configured content can include at least one of the following: resource duration, service duration, information of a group to which the first type of service belongs, identification of the first type of service, information size, initial arrival time of the first type of service, indication information of whether to use repeated transmission, the number of repetitions, the positional relationship between the repeated transmission and the original data packet transmission, the number of HARQ processes, or RV (redundancy version) number.

Still referring to FIG. 6, the repeated transmission is configured and the number of repeated transmissions corresponding to each service resource is 2. In the first service transmission resource, the original data packet 1 can be transmitted and then two repeated data packets of the original data packet 1 can be directly transmitted, and then the original data packet 2 and two repeated data packets of the original data packet 2 are transmitted, and so on. For brevity, details are not provided here.

Of course, there can also be other combinations. For example, referring to FIG. 7, two service transmission resources are configured, namely service transmission resource 1 and service transmission resource 2. In the two service transmission resources, the service transmission resource 1 is configured with the repeated transmission, and the service transmission resource 2 does not perform the repeated transmission. The number of repeated transmissions in service transmission resource 1 is three, and the positional relationship between the repeated transmission and original data packet transmission is that the repeated data packets are transmitted after all original data packets are transmitted.

In addition, the second communication unit 1001 is configured to, when at least two service transmission resources are configured in the same service cycle (or period), determine to transmit data packets for the same service on each of the service transmission resources, or to transmit data packets for at least two services. Services transmitted by different service transmission resources are the same or different. That is to say, regardless of whether one service transmission resource is configured or multiple service transmission resources are configured, data packets from the same traffic can be transmitted on each service transmission resource, or data packets from multiple traffics can be transmitted, and traffics transmitted on different service transmission resources can be the same or different.

In addition, the configured resource for the first type of service transmission can be dedicated to one user or shared by multiple users.

It should be understood that the above-mentioned FIGS. 3 to 7 are only examples. In actual processing, different service transmission resources or various information in the same service transmission resource can be set differently by the resource configuration information, and embodiments of the present disclosure do not impose specific limitations on this.

It should also be pointed out that if the resource configuration information includes information about the group to which the first type of service belongs, when performing resource configuration, the configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

If the resource configuration information includes the number of HARQ processes, the number of HARQ processes included in the resource configuration information can be the number of HARQs that can be configured in a service cycle or duration. Different RV numbers can be used for repeated packets of different data packets, and their correspondence can be preset correspondence.

On the basis of the foregoing scenarios, the second communication unit 1001 is configured to send second information to the network device, wherein the second information is used to assist the network device in determining of configuration of the resource for the first type of service transmission.

The second information includes: information of a group to which the first type of service belongs, and/or, identification of the first type of service. The second information further includes at least one of the following: a service priority, a latency level, or a reliability level.

In other words, the network device side can determine how to configure the transmission resource for the first type of service for the terminal device by the second information; or, it is possible to determine how to configure the transmission resource for the first type of service for the terminal device by receiving the second information sent from a core network device.

For example, how to configure the transmission resource for the first type of service can be determined based on identification of the first type of service. Different services can correspond to different duration. For example, some services correspond to three TTIs, and some services corresponds to one TTI.

The information of a group which the first type of service belongs to can be used for performing resource configuration. The configured resources can be determined based on the priority, or the latency level, or the reliability level corresponding to the group to which the first type of service belongs. For example, for the first type of service which belongs to a service group with a high priority, resources can be configured preferentially: for the first type of service which belongs to other service group with a low priority, resource configuration is performed later than the service with a high priority: or, resources with longer resource duration can be allocated to the first type of service with a higher priority: or, on the same service transmission resource, services with a high priority can be preferentially transmitted, and then services with a low priority can be transmitted: or, services with a high priority can be preferentially transmitted on the first configured service transmission resource, and then services with low priorities can be transmitted on other configured service transmission resource in the priority order. Of course, there can also be other configuration methods and details are not provided here. Regarding the latency level, resource configuration can be preferentially performed for services with low latency tolerance: or services with low delay tolerance can be preferentially transmitted on the configured service transmission resources and then services with high latency tolerance can be transmitted: or, the services with low latency tolerance can be preferentially transmitted on the first configured service transmission resource, and then the services with high latency tolerance may be transmitted on other configured service resources. The latency tolerance being low can be understood as high-reliability and low-latency services. In addition, resource configuration based on reliability level is similar to the aforementioned resource configuration based on priority, and will not be repeated.

It is also possible to further determine and configure the transmission resource for the first type of service according to the service priority of the first type of service. For example, the number of repetitions of the services with a high priority may be higher than the number of repetitions of services with a low priority: or, resources are preferentially configured for services with a high priority: or, resources are preferentially configured for services with a high latency level: or, services whose arrival time is closer to the service transmission delay boundary are preferentially transmitted, and so on.

In the foregoing embodiments, the resource duration is a continuous time span configured for the first type of service transmission: the service duration is a time span of continuous arrival of the first type of service. The resource duration is greater than or equal to the service duration: or the resource duration is smaller than the service duration.

The granularity of the time span is at least one of the following: a symbol, millisecond, TTI, a slot, a subframe, or a radio frame.

For example, if the granularity of the time span is a slot, then the resource duration can be defined as four slots and the service duration can be defined as three slots.

The service period is not smaller than the resource duration. The time position of the service transmission resource is included in the resource duration, one service transmission resource time matches the resource duration, or all service transmission resource times match the resource duration.

The resource duration is generally set to be greater than or equal to the service duration.

The second communication unit 1001 is configured to, when the resource duration is smaller than the service duration, not transmit the service exceeding the resource duration.

In other words, if the resource duration is smaller than the service duration, the terminal device can determine that when the duration of the service to be transmitted exceeds the resource duration, the remaining services will not be transmitted if the duration of the service transmission reaches the resource duration.

The resource configuration information further includes: resource configuration information used for uplink first type of service transmission, and/or resource configuration information used for downlink first type of service transmission: the resource configuration information used for the uplink first type of service transmission is the same as or different from the resource configuration information used for the downlink first type of service transmission. That is to say, when the sent resource configuration information is the resource configuration information used for uplink first type of service transmission, the terminal device can perform the uplink transmission of the first type of service based on the resource configuration information: and/or when the sent resource configuration information is the resource configuration information used for downlink first type of service transmission, the terminal device can perform the downlink transmission of the first type of service based on the resource configuration information, determine the received time-frequency resource positions, and receive the downlink information of the first type of service from the network side.

The second communication unit 1001 is configured to, when a first condition is met, send the resource report information to the network device.

The first condition includes one of at least one of the following conditions.

A bearer for the terminal device corresponding to the first type of service is established.

The terminal device receives a trigger indication from the network device. For example, the terminal receives trigger indication information sent from the network side, and if it is determined that the trigger indication information is received, the terminal device starts to send the resource report information to the network side.

The terminal device receives an indication that the network device has a capability of receiving the resource report information. For example, the network side may send indication information to the terminal device after the terminal device accesses the network, and the indication information may be used to inform the terminal device whether the network side has the capability to receive resource report information by a corresponding indication field. For example, when the indication information is 1, it indicates that the network side has the capability, and when the indication information is 0, or when the indication information does not appear, it means that the network side does not have the capability. Of course, the reverse is true in actual processing, and the setting is performed according to actual situations, and the details are not repeated.

A bearer for the terminal device is changed. That is, when the bearer for the terminal device is changed, the terminal device starts to send the resource report information.

A service feature of the first type of service for the terminal device is changed. The service feature can be determined by parameters such as QoS, and once such parameters are changed, the terminal device can be triggered to send the resource report information to the network device.

The terminal device meets a reporting period. The reporting period can be set according to actual situations, for example, resource report information can be reported once every 24 hours. According to some other embodiments, the reporting period can be set to a period of seconds, milliseconds, or minutes. Specific setting can be determined based on actual situations, and embodiments of the present disclosure do not list all the situations.

Finally, it should be pointed out that in embodiments of the present disclosure, the first type of service scenario includes but is not limited to at least one of the following: a periodic deterministic service, an aperiodic deterministic service, a mixed service, a non-deterministic service, a VoIP service, a control scenario of automated trains, motion control, a control-to-control application scenario, a mobile control panel, a mobile robot, audio streaming for live performance, and robotic arm operation.

In technical solutions according to embodiments of the present disclosure, the information related to resource configuration is used to transmit resource duration and/or service duration, so as to configure the resource for the first type of service transmission. In this way, it is possible to ensure that the related information is dynamically sent to the opposite end through the information to determine the transmission resource for the first type of service, and also ensure the matching between the configured resources and the service.

Figure 11:
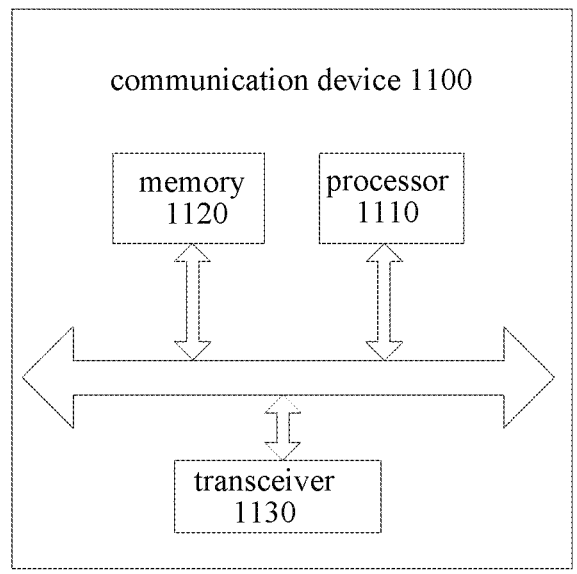
FIG. 11 is a schematic diagram showing the composition structure of a communication device according to an embodiment of the present disclosure.

FIG. 11 is a schematic structural diagram of a communication device 1100 according to an embodiment of the present disclosure. The communication device may be the terminal device or the network device in the previous embodiments of the present disclosure. The communication device 1100 shown in FIG. 11 includes a processor 1110, and the processor 1110 may call and run a computer program from a memory to perform the method in embodiments of the present disclosure.

According to embodiments, as shown in FIG. 11, the communication device 1100 may further include a memory 1120. The processor 1110 may call and run a computer program from the memory 1120 to perform the method in embodiments of the present disclosure.

The memory 1120 may be a separate device independent of the processor 1110, or may be integrated in the processor 1110.

According to embodiments, as shown in FIG. 11, the communication device 1100 may further include a transceiver 1130, and the processor 1110 may control the transceiver 1130 to communicate with other devices. Specifically, the transceiver may send information or data to other devices, or receive information or data sent by other devices.

The transceiver 1130 may include a transmitter and a receiver. The transceiver 1130 may further include one or more antennas.

According to embodiments, the communication device 1100 may specifically be the network device according to an embodiment of the present disclosure, and the communication device 1100 may implement the corresponding processes implemented by the network device in the method embodiments of the present disclosure. For brevity, details are not repeated here.

According to embodiments, the communication device 600 may specifically be the terminal device or network device in embodiments of the present disclosure, and the communication device 1100 may implement the corresponding processes implemented by the mobile terminal/terminal device in the method embodiments of the present disclosure. For brevity, details are not repeated here.

Figure 12:
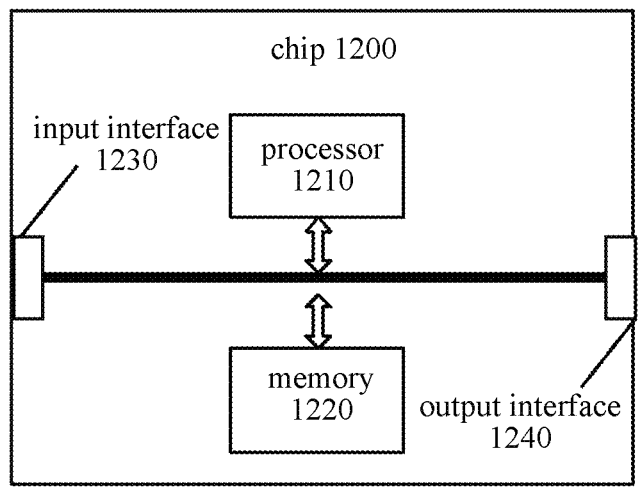
FIG. 12 is a schematic block diagram of a chip according to an embodiment of the present disclosure.

FIG. 12 is a schematic structural diagram of a chip according to an embodiment of the present disclosure. The chip 1200 shown in FIG. 12 includes a processor 1210, and the processor 1210 can call and run a computer program from a memory to implement the method according to embodiments of the present disclosure.

According to embodiments, as shown in FIG. 12, the chip 1200 may further include a memory 1220. The processor 1210 may call and run a computer program from the memory 1220 to implement the method according to embodiments of the present disclosure.

The memory 1220 may be a separate device independent of the processor 1210, or may be integrated in the processor 1210.

According to embodiments, the chip 1200 may further include an input interface 1230. The processor 1210 may control the input interface 1230 to communicate with other devices or chips, and specifically, the processor 1210 can control the input interface to obtain information or data sent by other devices or chips.

According to embodiments, the chip 1200 may further include an output interface 1240. The processor 1210 can control the output interface 1240 to communicate with other devices or chips, and specifically, the processor 1210 can control the output interface 1240 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the terminal device in embodiments of the present disclosure, and the chip can implement the corresponding processes implemented by the terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 13:
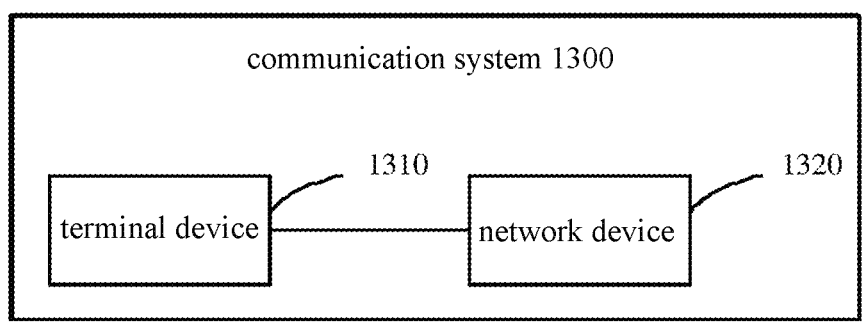
FIG. 13 is a second schematic diagram of communication system architecture according to an embodiment of the present disclosure.

FIG. 13 is a schematic block diagram of a communication system 1300 according to an embodiment of the present disclosure. As shown in FIG. 13, the communication system 1300 includes a terminal device 1310 and a network device 1320.

The terminal device 1310 may be used to implement the corresponding functions implemented by the terminal device in the foregoing methods, and the network device 1320 may be used to implement the corresponding functions implemented by the network device in the foregoing methods. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A resource configuration method, the method comprising:
sending, by a network side device in a 5G system, resource configuration information to a terminal device, wherein the resource configuration information is used to configure at least one service transmission resource;
wherein the resource configuration information comprises resource duration for an ultra-reliable low-latency service transmission and the resource configuration information further comprises at least one of the following:
indication information of whether to use a repeated transmission, whether to configure at least two service transmission resources in a same service period, whether to configure at least two service transmission resources within a same resource duration; and
wherein different service transmission resources transmit a same service.

2. The method according to claim 1, further comprising:
when at least two service transmission resources are configured in the same service period, determining to transmit data packets for the same service on each of the service transmission resources;
wherein the service period is for sending data packets and not smaller than the resource duration.

3. The method according to claim 1,
wherein when at least two service transmission resources are configured in the same service period or when the at least two service transmission resources are configured within the same resource duration, timing offsets for the at least two service transmission resources are different for different service transmissions.

4. The method according to claim 1, wherein when the resource configuration information comprises indication information of whether to use a repeated transmission, a positional relationship between a repeated transmission and an original data packet transmission comprises at least one of the following:
each original data packet being transmitted first and then a repeated data packet being transmitted.

5. The method according to claim 1, further comprising:
receiving second information, wherein the second information is used to assist the network side device in determining of configuration of the at least one service transmission resource for the ultra-reliable low-latency service transmission.

6. The method according to claim 1, wherein the resource duration is a continuous time span configured for the ultra-reliable low-latency service transmission.

7. The method according to claim 6, wherein the service period is not smaller than the resource duration.

8. The method according to claim 1, further comprising:
when the resource duration is smaller than a service duration, indicating that a service exceeding the resource duration is not transmitted.

9. The method according to claim 1, wherein the resource configuration information further comprises: resource configuration information used for uplink ultra-reliable low-latency service transmission, and/or resource configuration information used for downlink ultra-reliable low-latency service transmission;
wherein the resource configuration information used for the uplink ultra-reliable low-latency service transmission is the same as or different from the resource configuration information used for the downlink ultra-reliable low-latency service transmission.

10. A resource configuration method, the method comprising:
sending, by a terminal device, resource report information to a network side device, wherein the resource report information is used to assist the network side device in configuring at least one service transmission resource for an ultra-reliable low-latency service transmission;
wherein the resource report information comprises resource duration for the ultra-reliable low-latency service transmission;
wherein the resource report information further comprises at least one of the following:
indication information of whether to use a repeated transmission, whether to configure at least two service transmission resources in a same service period, whether to configure at least two service transmission resources within a same resource duration; and
wherein different service transmission resources transmit a same service.

11. The method according to claim 10, further comprising:
when at least two service transmission resources are configured in the same service period, determining to transmit data packets for the same service on each of the service transmission resources;
wherein the service period is for sending data packets and not smaller than the resource duration.

12. The method according to claim 11,
wherein when the at least two service transmission resources are configured in the same service period or when the at least two service transmission resources are configured within the same resource duration, timing offsets for the at least two service transmission resources are different for different service transmissions.

13. A network side device in a 5G system, comprising:
a memory for storing computer programs; and
a processor;
wherein the processor is configured to execute the computer programs to:
control a transceiver to send resource configuration information to a terminal device, wherein the resource configuration information is used to configure at least one service transmission resource;
wherein the resource configuration information comprises resource duration for an ultra-reliable low-latency service transmission and the resource configuration information further comprises at least one of the following: indication information of whether to use a repeated transmission, whether to configure at least two service transmission resources in a same service period, whether to configure at least two service transmission resources within a same resource duration; and wherein different service transmission resources transmit a same service.

14. The network device according to claim 13, wherein the resource duration is a continuous time span configured for the ultra-reliable low-latency service transmission.

15. The network device according to claim 14, wherein a granularity of the time span is at least one of the following: a symbol, millisecond, TTI, a slot, a subframe, or a radio frame.

16. The network device according to claim 14, wherein the service period is not smaller than the resource duration.

17. The network device according to claim 13, wherein the processor is configured to:
when the resource duration is smaller than a service duration, indicate that a service exceeding the resource duration is not transmitted.

18. The network device according to claim 13, wherein the resource configuration information further comprises: resource configuration information used for uplink ultra-reliable low-latency service transmission, and/or resource configuration information used for downlink ultra-reliable low-latency service transmission;
wherein the resource configuration information used for the uplink ultra-reliable low-latency service transmission is the same as or different from the resource configuration information used for the downlink ultra-reliable low-latency service transmission.

* * * * *